United States Patent
Zhang et al.

(10) Patent No.: US 11,982,636 B2
(45) Date of Patent: May 14, 2024

(54) METHOD FOR ACQUIRING TEMPERATURE

(71) Applicant: China Institute of Atomic Energy, Beijing (CN)

(72) Inventors: Shengdong Zhang, Beijing (CN); Dongdong Zhu, Beijing (CN); Yusong Li, Beijing (CN); Dongsheng Qie, Beijing (CN); Liang Xian, Beijing (CN); Runci Wang, Beijing (CN); Lijun Liu, Beijing (CN)

(73) Assignee: China Institute of Atomic Energy, Beijing (CN)

( * ) Notice: Subject to any disclaimer, the term of this patent is extended or adjusted under 35 U.S.C. 154(b) by 0 days.

(21) Appl. No.: 17/789,849

(22) PCT Filed: Jun. 17, 2022

(86) PCT No.: PCT/CN2022/099630
§ 371 (c)(1),
(2) Date: Jun. 29, 2022

(87) PCT Pub. No.: WO2022/268000
PCT Pub. Date: Dec. 29, 2022

(65) Prior Publication Data
US 2023/0288358 A1    Sep. 14, 2023

(30) Foreign Application Priority Data
Jun. 21, 2021 (CN) .................. 202110684920.X

(51) Int. Cl.
*G01N 25/48* (2006.01)
*G06N 3/04* (2023.01)
*G06N 3/08* (2023.01)

(52) U.S. Cl.
CPC ........... *G01N 25/4813* (2013.01); *G06N 3/04* (2013.01); *G06N 3/08* (2013.01)

(58) Field of Classification Search
CPC ......... G01N 25/4813; G06N 3/04; G06N 3/08
See application file for complete search history.

(56) References Cited

U.S. PATENT DOCUMENTS

2013/0191106 A1* 7/2013 Kephart ........... G05B 19/41885
  703/21
2015/0053902 A1* 2/2015 Avril ...................... C04B 14/00
  588/3

FOREIGN PATENT DOCUMENTS

JP          62148896 A   *  7/1987

* cited by examiner

*Primary Examiner* — Dennis White
(74) *Attorney, Agent, or Firm* — Merchant & Gould P.C.

(57) ABSTRACT

Provided are a method and a device for acquiring a temperature and a computer-readable storage medium. The method for acquiring a temperature includes: building a temperature acquisition model, wherein the temperature acquisition model is configured to acquire, based on an operating parameter of the radioactive substance treatment system input to the temperature acquisition model, a temperature of different parts of the radioactive reactant in the radioactive substance treatment system under a condition of the parameter; inputting a current operating parameter of the radioactive substance treatment system into the temperature acquisition model during the treatment for the radioactive substance; and acquiring a current temperature of different parts of the radioactive reactant in the radioactive substance treatment system output by the temperature acquisition model.

6 Claims, 4 Drawing Sheets

METHOD FOR ACQUIRING TEMPERATURE

CROSS-REFERENCE TO RELATED APPLICATION

This application is a National Stage Application of International Application No. PCT/CN2022/099630, filed on Jun. 17, 2022, entitled "METHOD FOR ACQUIRING TEMPERATURE", which claims priority to Chinese Application No. 202110684920.X, filed on Jun. 21, 2021, and which applications are hereby incorporated by reference in their entireties. To the extent appropriate, a claim of priority is made to each of the above disclosed applications.

TECHNICAL FIELD

The present disclosure relates to a field of a radioactive substance treatment technology, in particular to a method for acquiring a temperature of different parts of a radioactive reactant during a treatment for a radioactive substance.

BACKGROUND

With a rapid development of a nuclear industry, how to deal with a large amount of radioactive waste produced in the nuclear industry is an urgent problem to be solved. A solidification is a relatively safe and efficient method to deal with the radioactive waste.

The solidification refers to selecting a solidified matrix with a high stability to contain these nuclides for a long time. Common solidification methods include a glass solidification, a ceramic solidification, a glass-ceramic solidification, an artificial rock solidification, and various cement solidifications. The glass solidification technology is relatively mature, and a glass solidified body has advantages of a low leaching rate and a stable irradiation, so that the glass solidification technology becomes a hot spot in the research of solidification technology.

The glass solidification includes mixing a high-level waste liquid and a glass substrate in a certain proportion, which are calcined, melted and poured at a high temperature, and then converted into a stable glass solidified body after annealing. A glass solidification with phosphoric acid, phosphate or other phosphorus-containing substances as a glass-forming agent is called a phosphate glass solidification, and a glass solidification with silicon dioxide and diboron trioxide as a glass-forming agent is called a borosilicate glass solidification.

The research on the glass solidification began in the late 1950s. In the early days, there were many studies on the phosphate glass solidification. Later, it was found that the phosphate glass solidified body formed crystals after storage for a period of time, transparency was lost, and a leaching rate of radionuclides was significantly increased. Moreover, phosphoric acid is highly corrosive, and platinum is required for a melter and a solidification exhaust pipe. Therefore, a focus of the research turned to the borosilicate glass solidification. A research result shows that borosilicate glass is an ideal substrate for the solidification of the high-level waste liquid.

So far, the glass solidification has been developed for four generations. A first-generation melting process is a one-step tank process with induction heating metal furnace. The tank process is to add an evaporated concentrate of the high-level waste liquid and a glass-forming agent into a metal tank at the same time. The metal tank is heated by a medium frequency induction and divided into several zones. The liquid waste is evaporated in the tank, then melted and clarified together with the glass-forming agent, and finally a melted glass is discharged from a lower freeze-thaw valve.

A second-generation melting process is a two-step process with rotary calcining circuit+induction heating metal furnace, which is a process developed from the tank process. In a first step, the high-level waste liquid is first calcined in a rotary calciner to form a solid calcined material. In a second step, the calcined material and a glass-forming agent are respectively added to an intermediate frequency induction heating metal furnace, where they are melted and cast into glass, and finally injected into a glass storage tank through a freeze-thaw valve. This process has advantages of continuous generation and large processing capacity, but has disadvantages of complex process and insufficient furnace life.

A third-generation melting process is a Joule heating ceramic furnace process. The Joule heating ceramic furnace (referred to as electric furnace) process was first developed by the Pacific Northwest Laboratory in the United States. The Joule heating ceramic furnace is heated by electrodes, and a furnace body is composed of a refractory ceramic material. The high-level waste liquid and the glass-forming agent are separately added into the furnace, then the high-level waste liquid is evaporated in the furnace and is melted and cast into glass together with the glass-forming agent. The molten glass is discharged from a bottom freeze-thaw valve or overflow in batch or continuous mode. The Joule heating ceramic furnace has a large processing capacity and a relatively long furnace life (about 5 years). The disadvantage is that the furnace is large, which brings a difficulty to decommissioning, and a precious metal at the bottom of the furnace may deposit, which may affect the discharge.

A fourth-generation melting process is a cold crucible induction furnace process. A cold crucible is heated by a high-frequency induction. An outer wall of the furnace includes a water-cooled sleeve and a high-frequency induction coil. No refractory material is used, and no electrode heating is required. High-frequency (100-3000 kHz) induction heating may make the glass melted. Since the cooling water continuously passes through the water-cooled sleeve, a solid glass shell is formed near the sleeve in the furnace, and the molten glass is contained in the self-cooling solid glass layer. A cold cover is generally provided on top to limit a release of volatiles. In addition to melting glass, the cold crucible may be further used to melt scrap metal, treat spent fuel cladding, and incinerate waste plastics and waste resins with high chlorine and sulfur content.

The cold crucible furnace has a high melting temperature, and many objects may be treated. The molten glass is not in direct contact with the metal, which has advantages of small corrosiveness, long life of furnace body, and simple treatment of exhaust gas. Based on this, cold crucible technology is a hot technology researched at home and abroad.

No matter which of the above reaction vessels is used for the glass solidification treatment, a temperature measuring device is required to continuously monitor a temperature of a radioactive melt in the reaction vessel. However, as mentioned above, the reaction vessel generally has an extremely high temperature, and the radioactive melt is generally highly corrosive, which brings challenges to the service life of the temperature measuring device. A use of the temperature measuring device for temperature measurement is costly and generally requires an operator to adjust a position of the temperature measuring device, which involves many radioactive operations and has poor safety.

SUMMARY

In view of the above problems, the present disclosure is proposed to provide a method for acquiring a temperature of different parts of a radioactive reactant during a treatment for a radioactive substance, for overcoming the above problems or at least partially solving the above problems.

According to an embodiment of the present disclosure, there is provided a method for acquiring a temperature of different parts of a radioactive reactant during a treatment for a radioactive substance, wherein the treatment for the radioactive substance is performed in a radioactive substance treatment system, and the radioactive substance acts as the radioactive reactant in the radioactive substance treatment system; the method including: building a temperature acquisition model, wherein the temperature acquisition model is configured to acquire, based on an operating parameter of the radioactive substance treatment system input to the temperature acquisition model, a temperature of different parts of the radioactive reactant in the radioactive substance treatment system under a condition of the parameter; inputting a current operating parameter of the radioactive substance treatment system into the temperature acquisition model during the treatment for the radioactive substance; and acquiring a current temperature of different parts of the radioactive reactant in the radioactive substance treatment system output by the temperature acquisition model, wherein the building a temperature acquisition model includes: acquiring a plurality of sets of training data, wherein each set of training data includes: a temperature of different parts of the radioactive reactant in the radioactive substance treatment system measured at an $n^{th}$ time, and an operating parameter of the radioactive substance treatment system at the $n^{th}$ time, where n is an integer not less than 1; and training a learning model by using the plurality of sets of training data, so as to build the temperature acquisition model.

Optionally, the operating parameter of the radioactive substance treatment system includes: one or more parameters representing an operating power of the radioactive substance treatment system.

Optionally, the operating parameter of the radioactive substance treatment system further includes: one or more parameters representing a reaction environment in the radioactive substance treatment system.

Optionally, the operating parameter of the radioactive substance treatment system further includes: one or more parameters representing a composition and/or a physical state of the radioactive reactant in the radioactive substance treatment system.

Optionally, the temperature of the different parts of the radioactive reactant includes: a temperature inside the radioactive reactant; and a temperature of a surface of the radioactive reactant.

Optionally, each set of training data in the plurality of sets of training data is acquired by: measuring a temperature of at least one part inside the radioactive reactant at the $n^{th}$ time, so as to obtain the temperature inside the radioactive reactant according to the temperature of the at least one part inside the radioactive reactant; measuring a temperature of at least one part of a surface of the radioactive reactant at the $n^{th}$ time, so as to obtain the temperature of the surface of the radioactive reactant according to the temperature of the at least one part of the surface of the radioactive reactant; and acquiring the operating parameter of the radioactive substance treatment system at the $n^{th}$ time.

Optionally, the measuring a temperature of at least one part inside the radioactive reactant at the $n^{th}$ time includes: placing at least one temperature measuring end of a first temperature measuring device inside the radioactive reactant during the treatment for the radioactive substance, wherein when the first temperature measuring device includes a plurality of temperature measuring ends, the plurality of temperature measuring ends are placed at different parts inside the radioactive reactant; and reading, at the $n^{th}$ time, temperature measurement data output by the first temperature measuring device, so as to measure the temperature of the at least one part inside the radioactive reactant at the $n^{th}$ time.

Optionally, during the treatment for the radioactive substance, the radioactive reactant is a mixture of a molten substance and a solid substance, and the placing at least one temperature measuring end of a first temperature measuring device inside the radioactive reactant includes: placing the at least one temperature measuring end of the first temperature measuring device inside the molten substance in the radioactive reactant.

Optionally, the measuring a temperature of at least one part of a surface of the radioactive reactant at the $n^{th}$ time includes: acquiring, by using a second temperature measuring device, a visible light radiated by the radioactive reactant during the treatment for the radioactive substance; and analyzing the visible light acquired by the second temperature measuring device at the $n^{th}$ time, so as to measure the temperature of the at least one part of the surface of the radioactive reactant at the $n^{th}$ time.

According to an embodiment of the present disclosure, there is further provided a device for acquiring a temperature, for acquiring a temperature of different parts of a radioactive reactant during a treatment for a radioactive substance, wherein the treatment for the radioactive substance is performed in a radioactive substance treatment system, and the radioactive substance acts as the radioactive reactant in the radioactive substance treatment system; the device including one or more processors configured to: build a temperature acquisition model, wherein the temperature acquisition model is configured to acquire, based on an operating parameter of the radioactive substance treatment system input to the temperature acquisition model, a temperature of different parts of the radioactive reactant in the radioactive substance treatment system under a condition of the parameter; input a current operating parameter of the radioactive substance treatment system into the temperature acquisition model during the treatment for the radioactive substance; and acquire a current temperature of different parts of the radioactive reactant in the radioactive substance treatment system output by the temperature acquisition model, wherein, when building the temperature acquisition model, the one or more processors are further configured to: acquire a plurality of sets of training data, wherein each set of training data includes: a temperature of different parts of the radioactive reactant in the radioactive substance treatment system measured at an $n^{th}$ time, and an operating parameter of the radioactive substance treatment system at the $n^{th}$ time, where n is an integer not less than 1; and train a learning model by using the plurality of sets of training data, so as to build the temperature acquisition model.

According to an embodiment of the present disclosure, there is further provided a computer-readable storage medium having executable instructions stored thereon, wherein the instructions, when executed by a processor, cause the processor to perform the method described above.

DETAILED DESCRIPTION OF EMBODIMENTS

In order to make the objectives, technical solutions and advantages of the present disclosure clearer, the technical solutions of the present disclosure will be clearly and completely described below with reference to the accompanying drawings of the embodiments of the present disclosure. Obviously, the described embodiments are exemplary embodiments rather than all embodiments of the present disclosure. Based on the described embodiments of the present disclosure, all other embodiments obtained by those of ordinary skilled in the art without inventive effort fall within the scope of protection of the present disclosure.

Unless otherwise defined, technical or scientific terms used in the present disclosure should have the ordinary meaning as understood by those of ordinary skilled in the art to which the present disclosure belongs.

Figure 1:
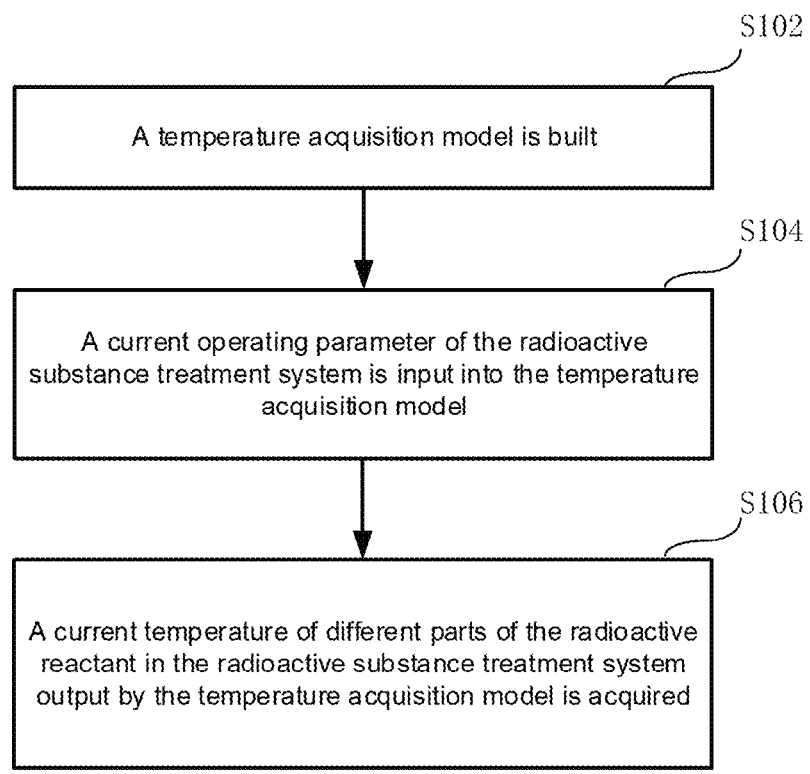
FIG. 1 shows a flowchart of a method for acquiring a temperature according to an embodiment of the present disclosure.

According to an embodiment of the present disclosure, a method for acquiring a temperature is firstly provided, which is used to acquire a temperature of different parts of a radioactive reactant in a radioactive substance treatment. The radioactive substance treatment is performed in a radioactive substance treatment system, and the radioactive substance acts as a radioactive reactant in the radioactive substance treatment system. Referring to FIG. 1, the method includes the following steps.

In step S102, a temperature acquisition model is built. The temperature acquisition model is used to acquire, based on an operating parameter of the radioactive substance treatment system input to the temperature acquisition model, a temperature of different parts of the radioactive reactant in the radioactive substance treatment system under a condition of the parameter.

In step S104, during the radioactive substance treatment, a current operating parameter of the radioactive substance treatment system is input into the temperature acquisition model.

In step S106, a current temperature of different parts of the radioactive reactant in the radioactive substance treatment system output by the temperature acquisition model is acquired.

Figure 2:
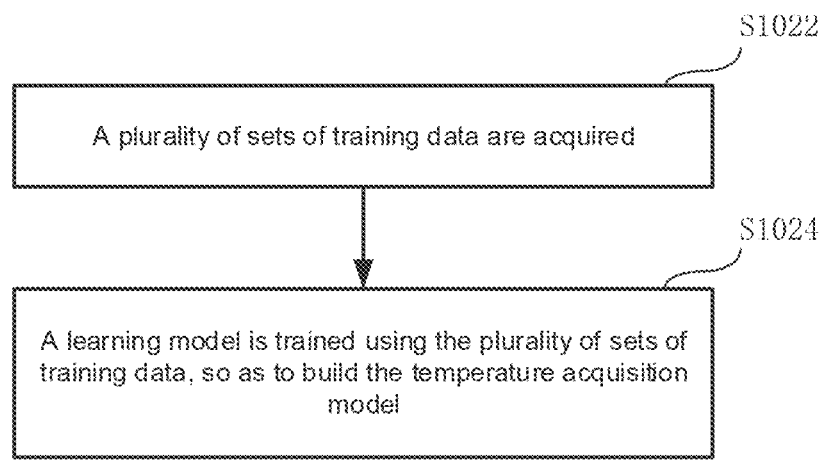
FIG. 2 shows a flowchart of a method for constructing a temperature acquisition model according to an embodiment of the present disclosure.

Referring to FIG. 2, building the temperature acquisition model includes the following steps.

In step S1022, a plurality of sets of training data are acquired. Each set of training data includes: a temperature of different parts of the radioactive reactant in the radioactive substance treatment system measured at an $n^{th}$ time, and an operating parameter of the radioactive substance treatment system at the $n^{th}$ time, where n is an integer not less than 1.

In step S1024, a learning model is trained using the plurality of sets of training data to build the temperature acquisition model.

In the embodiments of the present disclosure, the temperature acquisition model is built, so that in the process of radioactive substance treatment, it is only necessary to input the current operating parameter of the radioactive substance treatment system into the temperature acquisition model, and then the current temperature of different parts of the radioactive reactant output by the temperature acquisition model may be obtained. In this way, an operator does not need to manually operate a temperature measuring device to measure the temperature of different parts of the radioactive reactant, or even does not need the temperature measuring device, but only needs to read the parameter of the radioactive substance treatment system, thereby reducing the cost of temperature acquisition and improving a security.

Specifically, in the embodiments of the present disclosure, building the temperature acquisition model includes the above steps S1022 and S1024.

In step S1022, the plurality of sets of training data are acquired, and in step S1024, the plurality of sets of training data are used to train the learning model. A specific method of training the learning model using the plurality of sets of training data may refer to any method of machine learning, deep learning, etc. in the art. For example, the learning model may be a neural network model or the like, and the temperature acquisition model is constructed by training.

Each set of training data includes the temperature of different parts of the radioactive reactant in the radioactive substance treatment system measured at the $n^{th}$ time, and the operating parameter of the radioactive substance treatment system at the $n^{th}$ time, where n is an integer not less than 1. That is, the temperature of different parts of the radioactive reactant in each set of training data and the operating parameter of the radioactive substance treatment system are data at the same time. The operating parameter of the radioactive substance treatment system may generally refer to any parameter related to an operation state of the radioactive substance treatment system.

It may be understood that these operating parameters are closely related to a state of the radioactive reactant in the radioactive substance treatment system, and these operating parameters may change correspondingly with a change in the temperature of the radioactive reactant. Taking a specific embodiment as an example, each set of training data may include temperatures T1, T2, T3, T4 . . . Tx of different parts of the radioactive reactant and operating parameters P1, P2, P3 . . . Pn of the radioactive substance treatment system. These temperatures and these operating parameters are data acquired at the same time, that is, they correspond to each other. Considering the operating parameters as a plurality of independent variables, the temperatures of different parts of the reactant are a plurality of dependent variables. Therefore, the temperature acquisition model obtained by training the learning model using such sets of training data may represent a corresponding relationship between the operating parameters of the radioactive substance treatment system and the temperatures of different parts of the radioactive reactant.

In some embodiments, those skilled in the art may select an appropriate learning model as the basis for training, for example, a multivariate nonlinear regression model with a plurality of independent variables and a single dependent variable may be used. That is, a sub-model may be built with a plurality of operating parameters as independent variables and a temperature of one part of the radioactive reactant as a dependent variable, and the sub-model may be built for the temperature of each part in this way, so that in the embodiment, the temperature acquisition model includes the plurality of sub-models. During the radioactive substance treatment, one of the sub-models may be used to acquire the temperature of a corresponding part of the radioactive reactant. It may be understood that there are actually differences in the corresponding relationship between the temperatures of different parts of the radioactive reactant and the operating parameters, and this method of separately modeling for the temperature of each part may improve the accuracy of the modeling.

In some embodiments, instead of separately modeling for the temperature of each part, a multi-independent variable and multi-dependent variable learning model may be built directly, and this modeling method is more convenient.

In some embodiments, the operating parameter of the radioactive substance treatment system may include one or more parameters representing an operating power of the radioactive substance treatment system.

Figure 3:
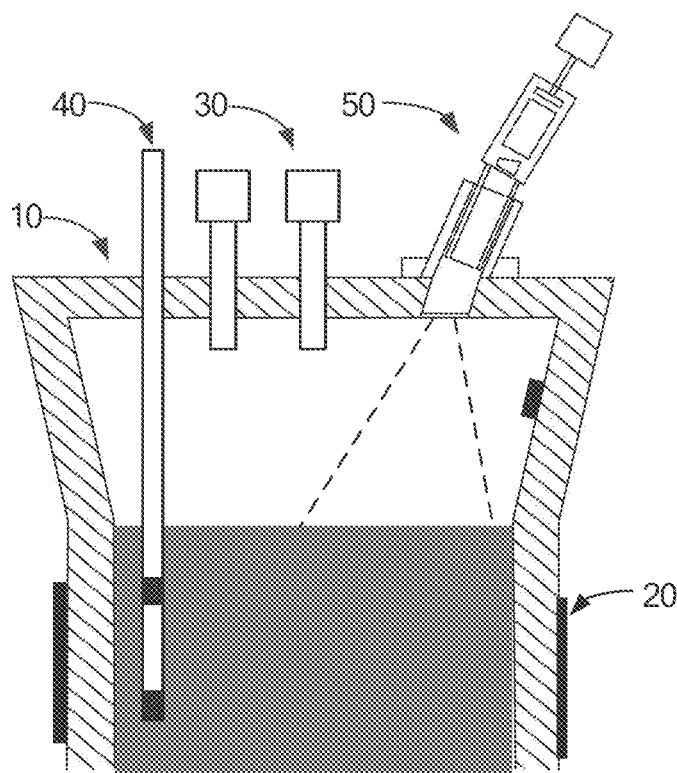
FIG. 3 shows a schematic diagram of a radioactive substance treatment system according to an embodiment of the present disclosure.

Referring to FIG. 3, the radioactive substance treatment system may include a reaction vessel 10, a heating device 20, a feeding device 30, etc., and may further include other devices such as a cooling device, a pressurizing device, etc. (not shown). The operating parameter of the radioactive substance treatment system may be a parameter representing the operating power of these devices, such as an operating voltage, operating current, operating frequency, etc. of the heating device 20, a motor operating rate of the feeding device 30, and the like.

In some embodiments, the operating parameter of the radioactive substance treatment system may further include one or more parameters representing a reaction environment inside the radioactive substance treatment system, e.g., pressure, humidity, bulk density, etc. inside the reaction vessel 10.

In some embodiments, the operating parameter of the radioactive substance treatment system may further include one or more parameters representing a composition and/or physical state of the radioactive reactant in the radioactive substance treatment system. For example, the radioactive reactant may be a mixture of multiple substances, and the operating parameter may include a mass ratio of each substance in the radioactive reactant, and may further include a density, stacking amount, and the like of the radioactive reactant.

It may be understood that various parameters that may be used as the operating parameters of the radioactive substance treatment system are described in the above-mentioned various embodiments. In fact, the operating parameters that may be selected are not limited to the parameters listed above, and any parameter related to the temperature of the reactant may be used as the operating parameter of the radioactive substance treatment system. However, it should be understood that if too many parameters are selected as the operating parameters, a computational load of modeling may increase, and in the process of radioactive substance treatment, collecting these parameters may consume more time, even the operation of collecting some parameters is more complicated than the operation of direct temperature measurement, which is not desired.

Therefore, when selecting the operating parameter of the radioactive substance treatment system, a parameter that is closely related to the temperature of the radioactive reactant and is easier to obtain is preferred, such as the operating voltage and operating current of the heating device, a liquid level and a stacking height in the reaction vessel 10, etc., so that in the actual radioactive substance treatment, the operator may acquire these operating parameters through direct reading or simple operations, and may acquire the temperature of different parts of the radioactive reactant by using these operating parameters.

In some embodiments, the temperature of different parts of the radioactive reactant may include a temperature inside the radioactive reactant and a temperature of a surface of the radioactive reactant. The temperature inside the radioactive reactant may refer to a temperature below a plane of a radioactive reactant stack, while the temperature of the surface of the radioactive reactant may refer to a temperature at the plane of the radioactive reactant stack. The internal temperature and the surface temperature may more accurately represent a temperature distribution of the radioactive reactant at this time. It may be understood that the temperature of different parts of the radioactive reactant is not limited to the interior and the surface, and those skilled in the art may select the temperature of different parts of the radioactive reactant according to the actual temperature acquisition requirements, which will not be described in detail here.

In some embodiments, acquiring each set of training data in the plurality of sets of training data may specifically include the following steps.

A temperature of at least one part inside the radioactive reactant is measured at the $n^{th}$ time, and a temperature inside the radioactive reactant is obtained according to the temperature of the at least one part inside the radioactive reactant. A temperature of at least one part of a surface of the radioactive reactant is measured at the $n^{th}$ time, and a temperature of the surface of the radioactive reactant is obtained according to the temperature of the at least one part of the surface of the radioactive reactant. The operating parameter of the radioactive substance treatment system at the $n^{th}$ time is acquired.

In this embodiment, when acquiring the internal temperature and the surface temperature of the radioactive reactant, a plurality of temperatures may be acquired and then averaged, so that relatively accurate internal temperature and surface temperature may be acquired.

Figure 4:
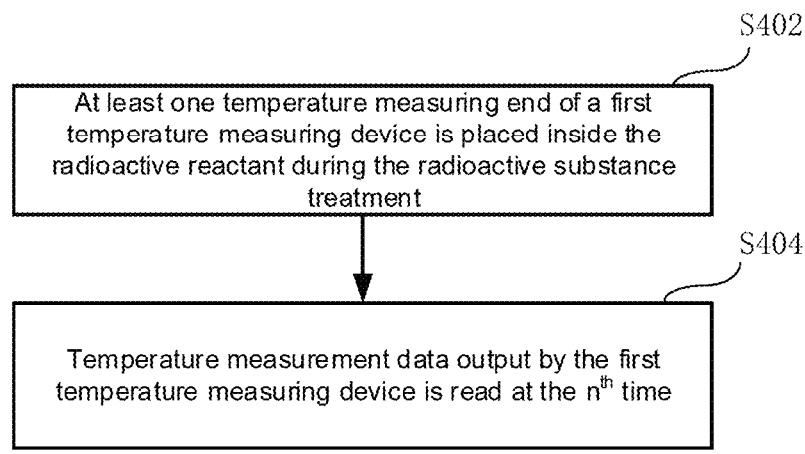
FIG. 4 shows a flowchart of a method for acquiring training data according to an embodiment of the present disclosure.

In some embodiments, referring to FIG. 4, measuring the temperature of at least one part inside the radioactive reactant at the $n^{th}$ time includes the following steps.

In step S402, at least one temperature measuring end of a first temperature measuring device 40 is placed inside the radioactive reactant during the radioactive substance treatment. When the first temperature measuring device 40 includes a plurality of temperature measuring ends, the plurality of temperature measuring ends are placed in different parts inside the radioactive reactant.

In step S404, temperature measurement data output by the first temperature measuring device 40 is read at the $n^{th}$ time, so as to measure the temperature of the at least one part inside the radioactive reactant at the $n^{th}$ time.

In this embodiment, the first temperature measuring device 40 is used to acquire the temperature inside the radioactive reactant. Referring to FIG. 3 again, the first temperature measuring device 40 may be a contact temperature measuring device. The temperature measuring end of the first temperature measuring device 40 is inserted into the interior of the radioactive reactant, so that the temperature of the radioactive reactant may be read from the terminal of the first temperature measuring device 40. In some embodiments, the first temperature measuring device 40 may have a plurality of temperature measuring ends, and the plurality of temperature measuring ends are respectively placed at different positions inside the radioactive reactant, so that a plurality of temperatures inside the radioactive reactant may be read simultaneously at the $n^{th}$ time, and the plurality of temperatures are averaged to obtain the temperature inside the radioactive reactant.

In some embodiments, a plurality of first temperature measuring devices 40 may be used simultaneously. Data output by the plurality of first temperature measuring devices 40 may be simultaneously read at the $n^{th}$ time, and may be averaged to obtain the temperature inside the radioactive reactant.

In some embodiments, the radioactive reactant is in a liquid or molten state, and the first temperature measuring device 40 may be directly inserted under a stacking plane of the radioactive reactant. In some embodiments, the radioactive reactant may be a mixture of solid substance and molten substance, the molten substance may have a temperature difference from the solid substance, and the temperature of the molten substance is actually a more desired temperature. In this case, the first temperature measuring device 40 is preferably placed inside the molten substance in the radioactive reactant, so as to prevent the first temperature measuring device 40 from measuring the temperature of the solid substance.

In these embodiments, a plurality of sets of training data may be acquired during one radioactive reactant treatment. For example, the temperature inside the radioactive reactant is read at a first time, and is read again at a second time, a third time, . . . the $n^{th}$ time, so that a plurality of sets of training data may be acquired.

Figure 5:
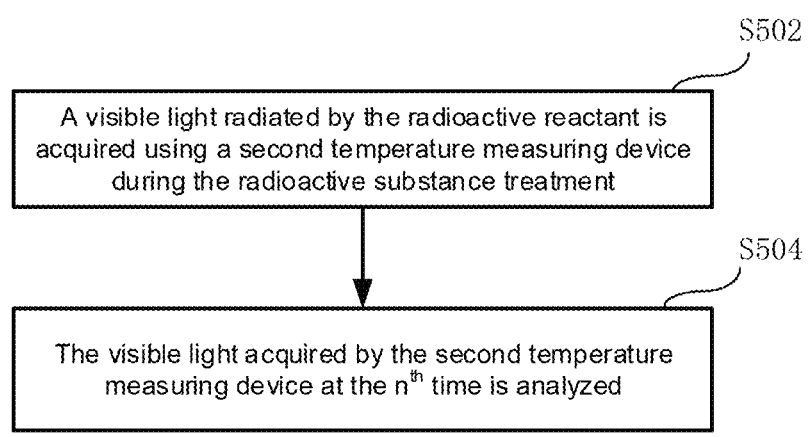
FIG. 5 shows a flowchart of a method for acquiring training data according to an embodiment of the present disclosure.

In some embodiments, referring to FIG. 5, measuring the temperature of at least one part of the surface of the radioactive reactant at the $n^{th}$ time includes: acquiring, by using a second temperature measuring device, a visible light radiated by the radioactive reactant during the radioactive substance treatment; and analyzing the visible light acquired by the second temperature measuring device at the $n^{th}$ time, so as to measure the temperature of at least one part of the surface of the radioactive reactant at the $n^{th}$ time.

It may be understood that the stacking plane of the radioactive reactants may change during the radioactive substance treatment. If the surface temperature of the radioactive reactant is measured using a contact temperature measuring device, it is necessary to adjust a position of the temperature measuring device when the stacking plane of the radioactive reactants changes, which may involve a radioactive operation. Such an operation is not desired although it is only required during the acquisition of training data.

Accordingly, a visible light temperature measurement method is used in this embodiment to acquire the temperature of the surface of the radioactive reactant. Still referring to FIG. 3, a wall of the reaction vessel 10 may be provided with a light-passing hole, and the second temperature measuring device 50 may be arranged outside the reaction vessel 10 and connected to the light-passing hole, so that the second temperature measuring device 50 may continuously obtain a visible light image of the radiation on the surface of the radioactive reactant stack during the radioactive substance treatment and may measure the temperature of at least one part of the surface of the radioactive reactant according to the visible light image. For example, the temperature of the surface of the radioactive reactant at the $n^{th}$ time may be obtained by analyzing the visible light image acquired at the $n^{th}$ time.

The second temperature measuring device 50 may be any suitable visible light temperature measuring device in the art. In some embodiments, the second temperature measuring device 50 may also be other suitable non-contact temperature measuring devices, such as an infrared temperature measuring device, etc. Those skilled in the art may select according to actual needs, and details are not described here. The second temperature measuring device 50 may also be used to acquire a plurality of sets of data in one radioactive substance treatment, and there is no need to adjust the position of the second temperature measuring device 50 in the process of acquiring data, so that the radioactive operation is further reduced and the safety of operator may be ensured.

Figure 6:
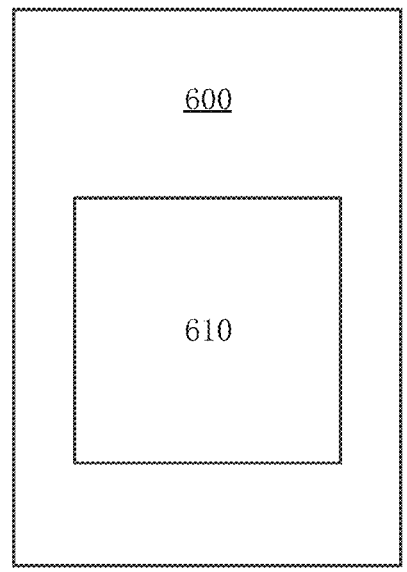
FIG. 6 shows a schematic diagram of a device for acquiring a temperature according to an embodiment of the present disclosure.

According to an embodiment of the present disclosure, there is further provided a device 600 of acquiring a temperature, which is used to acquire a temperature of different parts of a radioactive reactant during a radioactive substance treatment. The radioactive substance treatment is performed in a radioactive substance treatment system, and the radioactive substance acts as a radioactive reactant in the radioactive substance treatment system. Referring to FIG. 6, the device for acquiring a temperature includes one or more processors 610 used to: build a temperature acquisition model used to acquire, based on an operating parameter of the radioactive substance treatment system input to the temperature acquisition model, a temperature of different parts of the radioactive reactant in the radioactive substance treatment system under a condition of the parameter; input a current operating parameter of the radioactive substance treatment system into the temperature acquisition model during the radioactive substance treatment; and acquire the current temperature of different parts of the radioactive reactant in the radioactive substance treatment system output by the temperature acquisition model.

When building the temperature acquisition model, the one or more processors 610 are specifically used to acquire a plurality of sets of training data. Each set of training data includes: a temperature of different parts of the radioactive reactant in the radioactive substance treatment system measured at an $n^{th}$ time, and an operating parameter of the radioactive substance treatment system at the $n^{th}$ time, where n is an integer not less than 1. A learning model is trained using the plurality of sets of training data to build the temperature acquisition model.

In some embodiments, when acquiring each set of training data in the plurality of sets of training data, the one or more processors 610 are specifically used to: receive the temperature of at least one part inside the radioactive reactant measured at the $n^{th}$ time, and obtain the temperature inside the radioactive reactant according to the temperature of the at least one part inside the radioactive reactant; receive a temperature of at least one part of a surface of the radioactive reactant measured at the $n^{th}$ time, and obtain the temperature of the surface of the radioactive reactant according to the temperature of the at least one part of the surface of the radioactive reactant; and receive the operating parameter of the radioactive substance treatment system at the $n^{th}$ time.

In some embodiments, when receiving the temperature of at least one part inside the radioactive reactant measured at the $n^{th}$ time, the one or more processors 610 are specifically used to read, at the $n^{th}$ time, the temperature measurement data output by the first temperature measuring device 40, so as to measure the temperature of at least one part inside the radioactive reactant at the $n^{th}$ time. At least one temperature measuring end of the first temperature measuring device 40 is placed inside the radioactive reactant. When the first temperature measuring device 40 includes a plurality of temperature measuring ends, the plurality of temperature measuring ends are placed at different positions inside the radioactive reactant.

In some embodiments, when receiving the temperature of at least one part of the surface of the radioactive reactant measured at the $n^{th}$ time, the one or more processors 610 are specifically used to: receive a visible light acquired by the second temperature measuring device at the $n^{th}$ time and analyze the visible light, so as to measure the temperature of at least one part of the surface of the radioactive reactant at the $n^{th}$ time. The second temperature measuring device is used to acquire the visible light radiated by the radioactive reactant during the radioactive substance treatment. For the technical details of the specific implementation of the temperature measuring device, reference may be made to the foregoing content, which will not be repeated here.

Figure 7:
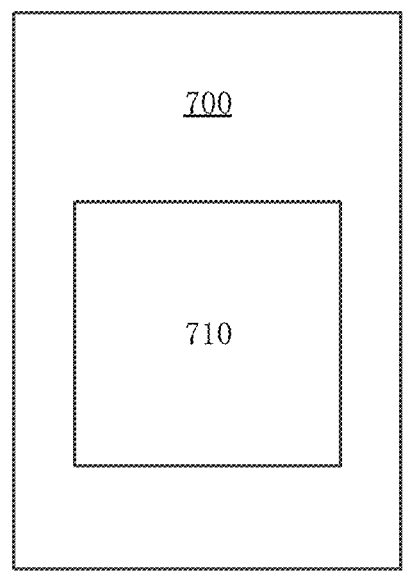
FIG. 7 shows a schematic diagram of a computer-readable storage medium according to an embodiment of the present disclosure.

According to an embodiment of the present disclosure, there is provided a computer-readable storage medium 700. Referring to FIG. 7, executable instructions 710 are stored thereon, and when executed by a processor, the instructions 710 cause the processor to perform any of the methods described above.

For a specific implementation of the computer-readable storage medium, reference may be made to the foregoing content, and details are not repeated here.

The method and the device for acquiring a temperature and the computer-readable storage medium according to the embodiments of the present disclosure may be implemented to acquire, by means of the temperature acquisition model, the temperature of different parts of the radioactive reactant according to a plurality of operating parameters of the radioactive substance treatment system, so that a radioactive operation in the temperature acquisition may be reduced, a safety in the temperature acquisition may be improved, and a dependence of the temperature measuring device may be reduced.

Those skilled in the art may understand that all or part of the processes in the method of the above embodiments may be performed by instructing relevant hardware through a computer program, and the computer program may be stored in a non-volatile computer-readable storage medium. When executed, the computer program may contain the processes in various method embodiments described above.

Any reference to memory, storage, database or other medium used in the various embodiments provided by the present disclosure may include non-volatile and/or volatile memory. The non-volatile memory may include read only memory (ROM), programmable ROM (PROM), electrically programmable ROM (EPROM), electrically erasable programmable ROM (EEPROM), or flash memory. The volatile memory may include random access memory (RAM) or external cache memory. By way of illustration and not limitation, RAM is available in various forms such as static RAM (SRAM), dynamic RAM (DRAM), synchronous DRAM (SDRAM), double data rate SDRAM (DDRS-DRAM), enhanced SDRAM (ESDRAM), synchronous link (Synchlink) DRAM (SLDRAM), Rambus direct RAM (RDRAM), direct Rambus dynamic RAM (DRDRAM), and Rambus dynamic RAM (RDRAM), etc.

The technical features of the above embodiments may be combined arbitrarily. In order to simplify the description, not all possible combinations of the technical features in the above embodiments are described. However, in a case of no contradiction, the combinations of these technical features should be considered to fall within the scope described in this specification. The above embodiments only express several implementations of the present disclosure, and specific and detailed description thereof should not be construed as limiting the scope of the present disclosure. It should be noted that for those skilled in the art, various modifications and improvements made without departing from the concept of the present disclosure all belong to the scope of protection of the present disclosure. Therefore, the scope of protection of the patent of the present disclosure shall be determined by the appended claims.

What is claimed is:

1. A method for acquiring a temperature, for acquiring a temperature of different parts of a radioactive reactant during a treatment for a radioactive substance, wherein the treatment for the radioactive substance is performed in a radioactive substance treatment system, and the radioactive substance acts as the radioactive reactant in the radioactive substance treatment system;

the method comprising:
building a temperature acquisition model, wherein the temperature acquisition model is configured to acquire, based on an operating parameter of the radioactive substance treatment system input to the temperature acquisition model, a temperature of different parts of the radioactive reactant in the radioactive substance treatment system under a condition of the parameter;
inputting a current operating parameter of the radioactive substance treatment system into the temperature acquisition model during the treatment for the radioactive substance; and
acquiring a current temperature of different parts of the radioactive reactant in the radioactive substance treatment system output by the temperature acquisition model,
wherein the building a temperature acquisition model comprises:
acquiring a plurality of sets of training data, wherein each set of training data comprises: a temperature of different parts of the radioactive reactant in the radioactive substance treatment system measured at an $n^{th}$ time, and an operating parameter of the radioactive substance treatment system at the $n^{th}$ time, where n is an integer not less than 1; and
training a learning model by using the plurality of sets of training data through deep learning, so as to build the temperature acquisition model, wherein the learning model is a neural network model,
wherein the operating parameter of the radioactive substance treatment system comprises:
one or more parameters representing an operating power of the radioactive substance treatment system, the operating power comprises an operating voltage, operating current and operating frequency of a heating device of the radioactive substance treatment system, and a motor operating rate of a feeding device of the radioactive substance treatment system,
wherein the temperature of the different parts of the radioactive reactant comprises:

a temperature inside the radioactive reactant; and a temperature of a surface of the radioactive reactant, wherein the temperature inside the radioactive reactant refers to a temperature below a plane of a radioactive reactant stack, and the temperature of the surface of the radioactive reactant refers to a temperature at the plane of the radioactive reactant stack, wherein each set of training data in the plurality of sets of training data is acquired by:

measuring a temperature of at least one part inside the radioactive reactant at the $n^{th}$ time, so as to obtain the temperature inside the radioactive reactant according to the temperature of the at least one part inside the radioactive reactant;

measuring a temperature of at least one part of a surface of the radioactive reactant at the $n^{th}$ time, so as to obtain the temperature of the surface of the radioactive reactant according to the temperature of the at least one part of the surface of the radioactive reactant and;

acquiring the operating parameter of the radioactive substance treatment system at the $n^{th}$ time, wherein the measuring a temperature of at least one part inside the radioactive reactant at the $n^{th}$ time comprises:

placing at least one temperature measuring end of a first temperature measuring device inside the radioactive reactant during the treatment for the radioactive substance, wherein the first temperature measuring device comprises a plurality of temperature measuring ends placed at different parts inside the radioactive reactant and;

reading, at the $n^{th}$ time, temperature measurement data output by the first temperature measuring device, so as to measure the temperature of the at least one part inside the radioactive reactant at the $n^{th}$ time, wherein the first temperature measuring device is a contact temperature measuring device, and a plurality of temperatures measured from the plurality of temperature measuring ends are averaged to obtain the temperature inside the radioactive reactant, wherein, during the treatment for the radioactive substance, the radioactive reactant is a mixture of a molten substance and a solid substance, and the placing at least one temperature measuring end of a first temperature measuring device inside the radioactive reactant comprises:

placing the at least one temperature measuring end of the first temperature measuring device inside the molten substance in the radioactive reactant so as to prevent the first temperature measuring device from measuring a temperature of the solid substance.

2. The method according to claim 1, wherein the operating parameter of the radioactive substance treatment system further comprises:

one or more parameters representing a reaction environment in the radioactive substance treatment system.

3. The method according to claim 1, wherein the operating parameter of the radioactive substance treatment system further comprises:

one or more parameters representing a composition and/or a physical state of the radioactive reactant in the radioactive substance treatment system.

4. The method according to claim 1, wherein the measuring a temperature of at least one part of a surface of the radioactive reactant at the $n^{th}$ time comprises:

acquiring, by using a second temperature measuring device, a visible light radiated by the radioactive reactant during the treatment for the radioactive substance; and analyzing the visible light acquired by the second temperature measuring device at the $n^{th}$ time, so as to measure the temperature of the at least one part of the surface of the radioactive reactant at the $n^{th}$ time.

5. A computer-readable storage medium having executable instructions stored thereon, wherein the instructions, when executed by a processor, cause the processor to perform the method of claim 1.

6. A device for acquiring a temperature, for acquiring a temperature of different parts of a radioactive reactant during a treatment for a radioactive substance, wherein the treatment for the radioactive substance is performed in a radioactive substance treatment system, and the radioactive substance acts as the radioactive reactant in the radioactive substance treatment system;

the device comprising one or more processors configured to:

build a temperature acquisition model, wherein the temperature acquisition model is configured to acquire, based on an operating parameter of the radioactive substance treatment system input to the temperature acquisition model, the temperature of different parts of the radioactive reactant in the radioactive substance treatment system under a condition of the parameter;

input a current operating parameter of the radioactive substance treatment system into the temperature acquisition model during the treatment for the radioactive substance; and acquire a current temperature of different parts of the radioactive reactant in the radioactive substance treatment system output by the temperature acquisition model, wherein, when building the temperature acquisition model, the one or more processors are further configured to:

acquire a plurality of sets of training data, wherein each set of training data comprises: a temperature of different parts of the radioactive reactant in the radioactive substance treatment system measured at an $n^{th}$ time, and an operating parameter of the radioactive substance treatment system at the $n^{th}$ time, where n is an integer not less than 1; and train a learning model by using the plurality of sets of training data through deep learning, so as to build the temperature acquisition model, wherein the learning model is a neural network model;

wherein the operating parameter of the radioactive substance treatment system comprises:

one or more parameters representing an operating power of the radioactive substance treatment system, the operating power comprises an operating voltage, operating current and operating frequency of a heating device of the radioactive substance treatment system, and a motor operating rate of a feeding device of the radioactive substance treatment system, wherein the temperature of the different parts of the radioactive reactant comprises:

a temperature inside the radioactive reactant; and a temperature of a surface of the radioactive reactant, wherein the temperature inside the radioactive reactant refers to a temperature below a plane of a radioactive reactant stack, and the temperature of the surface of the radioactive reactant refers to a temperature at the plane of the radioactive reactant stacks;

wherein each set of training data in the plurality of sets of training data is acquired by:

measuring a temperature of at least one part inside the radioactive reactant at the $n^{th}$ time, so as to obtain the temperature inside the radioactive reactant according to the temperature of the at least one part inside the radioactive reactant;

measuring a temperature of at least one part of a surface of the radioactive reactant at the $n^{th}$ time, so as to obtain the temperature of the surface of the radioactive reactant according to the temperature of the at least one part of the surface of the radioactive reactant; and acquiring the operating parameter of the radioactive substance treatment system at the $n^{th}$ time, wherein the measuring a temperature of at least one part inside the radioactive reactant at the $n^{th}$ time comprises:

placing at least one temperature measuring end of a first temperature measuring device inside the radioactive reactant during the treatment for the radioactive substance, wherein first temperature measuring device comprises a plurality of temperature measuring ends placed at different parts inside the radioactive reactant; and reading, at the $n^{th}$ time, temperature measurement data output by the first temperature measuring device, so as to measure the temperature of the at least one part inside the radioactive reactant at the $n^{th}$ time, wherein the first temperature measuring device is a contact temperature measuring device, and a plurality of temperatures measured from the plurality of temperature measuring ends are averaged to obtain the temperature inside the radioactive reactant, wherein, during the treatment for the radioactive substance, the radioactive reactant is a mixture of a molten substance and a solid substance, and the placing at least one temperature measuring end of a first temperature measuring device inside the radioactive reactant comprises:

placing the at least one temperature measuring end of the first temperature measuring device inside the molten substance in the radioactive reactant so as to prevent the first temperature measuring device from measuring a temperature of the solid substance.

* * * * *